US008520085B2

(12) United States Patent
Chen et al.

(10) Patent No.: US 8,520,085 B2
(45) Date of Patent: Aug. 27, 2013

(54) METHOD OF FULL FRAME VIDEO STABILIZATION

(75) Inventors: Bing-Yu Chen, Taipei (TW); Wei-Ting Huang, Taipei (TW); Jong-Shan Lin, Taipei (TW)

(73) Assignee: National Taiwan University, Taipei (TW)

( * ) Notice: Subject to any disclaimer, the term of this patent is extended or adjusted under 35 U.S.C. 154(b) by 680 days.

(21) Appl. No.: 12/372,484

(22) Filed: Feb. 17, 2009

(65) Prior Publication Data

US 2009/0213234 A1    Aug. 27, 2009

(30) Foreign Application Priority Data

Feb. 18, 2008   (TW) ................................ 97105545 A

(51) Int. Cl.
*H04N 5/228*   (2006.01)
(52) U.S. Cl.
USPC ...................... 348/208.99; 348/155; 348/169
(58) Field of Classification Search
None
See application file for complete search history.

(56) References Cited

U.S. PATENT DOCUMENTS

| | | | | |
|---|---|---|---|---|
| 2001/0043738 | A1* | 11/2001 | Sawhney et al. | 382/154 |
| 2002/0030741 | A1* | 3/2002 | Broemmelsiek | 348/169 |
| 2003/0090593 | A1* | 5/2003 | Xiong | 348/620 |
| 2004/0175035 | A1* | 9/2004 | Kameyama | 382/173 |
| 2005/0280707 | A1* | 12/2005 | Sablak et al. | 348/155 |
| 2006/0257042 | A1* | 11/2006 | Ofek et al. | 382/255 |
| 2006/0274156 | A1* | 12/2006 | Rabbani et al. | 348/208.99 |
| 2009/0021588 | A1* | 1/2009 | Border et al. | 348/208.1 |
| 2009/0048842 | A1* | 2/2009 | Albrecht et al. | 704/260 |

OTHER PUBLICATIONS

Wang et al. "Video shop: A new framework for spatial-temporal video editing in gradient domain", ScienceDirect, available online Aug. 21, 2006.*
Buehler et al. Non-Metric Image-Based Rendering for Video Stabilization, Proc. IEEE CVPR 2001, vol. 2, pp. 609-614, 2001.
Litvin et al. Probabilistic Video Stabilization using Kalman Filtering and Mosaicking,Proc. SPIE EI 2003, vol. 5022, pp. 663-674, 2003.
Matsushita et al.,Full-Frame Video Stabilization, Proc. IEEE CVPR 2005, vol. 1, pp. 50-57, 2005.
Gleicher & Liu, Re-cinematography: improving the camera dynamics of casual video. In ACM Multimedia 2007 Conference Proceedings (2007), pp. 27-36.
Wexler et al., Space-Time Video Completion,Proc. IEEE CVPR 2004, vol. 1, pp. 120-127, 2004.
Shiratori et al., Video Completion by Motion Field Transfer,Proc. IEEE CVPR 2006, vol. 1, pp. 411-418, 2006.

(Continued)

*Primary Examiner* — Roberto Velez
*Assistant Examiner* — Yih-Sien Kao
(74) *Attorney, Agent, or Firm* — WPAT, P.C.; Anthony King

(57) ABSTRACT

A method of full-frame video stabilization with a polyline-fitted camcorder path is disclosed. The regions was first considered of interest in the video to estimate which regions or objects the user wants to capture, and then use a polyline to estimate a new stable camcorder motion path while avoiding the user's interested regions or objects being cut out. Then, the dynamic and static missing areas caused by frame alignment from other frames were filled to keep the same resolution and quality as the original video. Furthermore, the discontinuous regions were smoothed by using a three-dimensional Poisson-based method. After the above automatic operations, a full-frame stabilized video could be achieved and the important regions and objects could also be preserved.

14 Claims, 15 Drawing Sheets

(56) References Cited

OTHER PUBLICATIONS

Jia et al., Video Repairing Inference of Foreground and Background under Severe Occlusion, Proc. IEEE CVPR 2004, vol. 1, pp. 364-371, 2004.

Patwardhan et al., Video Inpainting under Constrained Camera Motion, IEEE TIP, vol. 16, No. 2, pp. 545-553, 2007.

Itti et al., A model of saliency-based visual attention for rapid scene analysis. IEEE Transactions on Pattern Analysis and Machine Intelligence 20, 11 (1998), 1254-1259.

* cited by examiner

ND OF FULL FRAME VIDEO
METHOD OF FULL FRAME VIDEO STABILIZATION

FIELD OF THE INVENTION

Shaky motion is one of the significant problems in home videos, since hand shake is an unavoidable effect when capturing by using a hand-held camcorder. Video stabilization is an important technique to solve this problem. However, the stabilized video resulted by current methods usually has decreased resolution.

BACKGROUND OF THE INVENTION

As the use of digital camcorders grows, to capture videos using hand-held camcorders becomes more and more convenient than before. However, since most people usually do not bring a tripod with their camcorders, unwanted vibration in video sequence is an unavoidable effect due to the handshakes. To avoid or remove the annoying shaky motion is one of the significant problems in home videos, and video stabilization is an important technique to solve this problem. Many existed video stabilization applications result a stabilized video by smoothing the camcorder motion path and then truncating the missing areas after aligning the video frames along the smoothed motion path. Hence, the stabilized videos still have many unexpected movements, since only high frequency shaky motions are removed during the smoothing stage. Moreover, the video qualities of the stabilized videos are usually decreased due to the truncating stage.

Video stabilization is an important research topic in the fields of multimedia, image processing, computer vision, and computer graphics. Buehler et al. ("Non-Metric Image-Based Rendering for Video Stabilization," *Proc. IEEE CVPR* 2001, Vol. 2, pp. 609-614, 2001) proposed an image-based rendering (IBR) method to stabilize videos. Recently, image processing methods are widely used for video stabilization. For estimating the camcorder motion path, Litvin et al. ("Probabilistic Video Stabilization using Kalman Filtering and Mosaicking," Proc. SPIE EI 2003, Vol. 5022, pp. 663-674, 2003) estimated a new camcorder motion path by altering camera parameter, and Matsushita et al. ("Full-Frame Video Stabilization," Proc. PS IEEE CVPR 2005, Vol. 1, pp. 50-57, 2005) smoothed the camcorder motion path to reduce the high frequency shaky motions. However, although the high frequency shaky motions can be easily reduced, the stabilized videos still have low frequency unexpected movements. Gleicher and Liu ("Re-cinematography: improving the camera dynamics of casual video. In ACM Multimedia 2007 Conference Proceedings (2007), pp. 27-36") stabilized the camcorder motion to be piecewise constant, which is similar with our method, but the ROI and the possibility of missing area completion were taken into consideration.

When filling up the missing image areas, there are some image inpainting approaches developed for recovering the missing holes in the image. Although these approaches can complete the missing areas with correct structure, but there will be obvious discontinuity if each video frame was recovered respectively. Litvin et al. ("Probabilistic Video Stabilization using Kalman Filtering and Mosaicking," Proc. SPIE EI 2003, Vol. 5022, pp. 663-674, 2003) used mosaic method to fill up the missing areas in the stabilized video; however they did not consider the moving objects would appear at the boundary of the video. Wexler et al. ("Space-Time Video Completion," *Proc. IEEE CVPR* 2004, Vol. 1, pp. 120-127, 2004) and Shiratori et al. ("Video Completion by Motion Field Transfer," Proc. IEEE CVPR 2006, Vol. 1, pp. 411-418, 2006) filled up the missing holes by sampling the spatio-temporal volume patches from other portion of the video volume. The former approach used the most similar patch in color space for completing the missing holes and the later one used the patch with similar motion vector. The drawback of these methods is that they need large computing time for searching a proper patch. Jia et al. ("Video Repairing Inference of Foreground and Background under Severe Occlusion," *Proc. IEEE CVPR* 2004, Vol. 1, pp. 364-371, 2004) and Patwardhan et al. ("Video Inpainting under Constrained Camera Motion," *IEEE TIP*, Vol. 16, No. 2, pp. 545-553, 2007) segmented the video into two layers and recovered them individually. These methods focused on long and periodic observed time of the moving objects, but this is not guaranteed in common home videos.

SUMMARY OF THE INVENTION

The preset invention provides a method of full frame video stabilization with polyline-fitted camcorder path, comprising the steps:
 a) making motion path estimation, further including steps:
  i) combining all transformations between consecutive frames to obtain a global motion path of the original video;
  ii) approximating the global motion path with polyline; and
  iii) changing position of each frame in accordance with frame alignment along new motion path;
 b) making video completion, further including steps:
  i) detecting and locating existing moving objects
  ii) separating the moving objects as dynamic foreground regions from static background regions and complete the missing areas;
  iii) filling the missing areas with pixels on the frames far from the current frame; and
  iv) smoothing discontinuous regions by applying a three-dimensional Poisson-based approach; and
 c) deblurring image of frames by transferring the pixel values from neighboring sharper frames to the blurry frames.

DETAILED DESCRIPTION OF THE INVENTION

Figure 1:
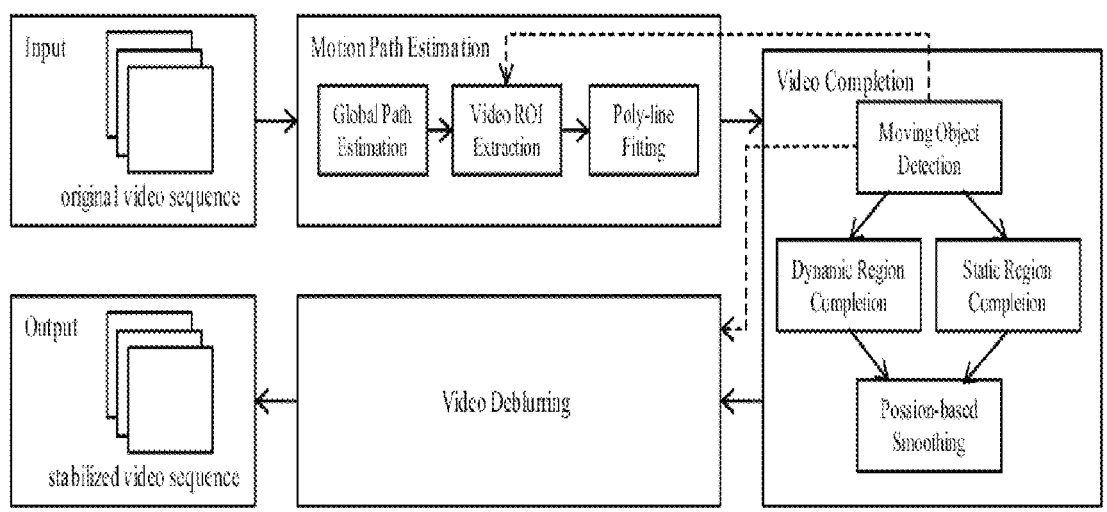
FIG. 1 is a block diagram indicating system framework of the present invention.

The present invention provides a novel, robust, and practical method of full-frame video stabilization with a polyline-fitted camcorder path. To guess the user's capturing intention, the regions of interest (ROI) are considered in the original captured video to estimate which regions or objects the user really wants to capture, and then a polyline is used to estimate a new stable camcorder motion while avoiding the user's interested regions or objects being cut out, since the camcorder motion path of the video captured with a tripod is like a polyline. Hence, the resulted video is much stable and much close to the video that the user wants to capture, since the capturing regions and objects are preserved and the camcorder motion path is stabilized as capturing with a tripod. To align the video frames along the stabilized camcorder motion path causes some missing areas, which need to be completed. While estimating the camcorder motion path, the possibility of missing area completion should be taken into consideration.

After aligning the video frames, the dynamic and static missing areas are filled respectively. Since a polyline is used to fit the camcorder motion path rather than using a parametric curve, the missing areas are usually large and can not be easily completed by neighboring frames. To fill the missing areas using the frames far from the current one would cause discontinuity at the boundary of the filled areas, since the intensity of each video frame is usually not necessarily the same. Hence, the discontinuous boundaries are smoothed by using a three-dimensional Poisson-based method while taking both of the spatial and temporal consistency into consideration, so that it can result seamless stitching spatially and temporally. In particular, the present invention provides a method of full frame video stabilization with polyline-fitted camcorder path, comprising the steps:

First, motion path estimation which is including combining all transformations between consecutive frames to obtain a global motion path by SIFT (Scale Invariant Feature Transform) and RANSAC (RANdom SAmple Consensus), approximating it with polyline which applying Kalman filter to estimate a smooth camcorder motion (Kalman path), finding regions of interest (ROI) and changing position with frame alignment along motion path. Second, video completion includes detecting moving objects with affine transformation and optical flow approach, separating the moving objects, and using a geometric relationship to fill the missing areas then smoothing discontinuous regions. Finally, deblurring image of frames is applied by transferring the pixel values from neighboring sharper frames to the blurry frames.

Accordingly, the present invention provides a method of full frame video stabilization with polyline-fitted camcorder path, comprising the steps:
a) making motion path estimation, further including steps:
i) combining all transformations between consecutive frames to obtain a global motion path of the original video;
ii) approximating the global motion path with polyline;
iii) changing position of each frame in accordance with frame alignment along new motion path;
b) making video completion, further including steps:
i) detecting and locating existing moving objects
ii) separating the moving objects as dynamic foreground regions from static background regions and completing the missing areas;
iii) filling the missing areas with pixels on the frames far from the current frame;
iv) smoothing discontinuous regions by applying a three-dimensional Poisson-based approach; and
c) deblurring image of frames by transferring the pixel values from neighboring sharper frames to the blurry frames.

In a preferred embodiment, the combining step further comprises (1) extracting the feature points of each frame by SIFT (Scale Invariant Feature Transform), which is invariant to scaling and rotation of the image, (2) matching feature points on each consecutive frame and RANSAC (RANdom SAmple Consensus) is used to select the inliers of the matched feature pairs, or (3) obtaining the transformation matrices between the consecutive frames by an over-constrained system.

In a preferred embodiment, the approximating step further comprises (1) separating the camcorder motion path to be horizontal path and vertical path, (2) applying Kalman filter to estimate a smooth camcorder motion (Kalman path) which is represented in two-dimensional space, or (3) using a polyline to fit the Kalman path.

In a preferred embodiment, the detecting step further comprises using an affine transformation or using an optical flow approach to obtain the motion vector of each pixel.

In a preferred embodiment, the separating step further comprises evaluating the motion value of pixels within each frame by calculating the length of the motion vector.

In a preferred embodiment, the filling step further comprises (1) using a geometric relationship to estimate position of the dynamic object pixel on the next frame according to motion vector of the object pixel, (2) filling missing dynamic frames with estimated motion vectors instead filling from neighbor frames directly, (3) directly copying the warped neighboring frames to the missing static frames, or (4) using a simple image inpainting approach to complete static missing areas cannot be recovered.

In a preferred embodiment, the smoothing step further comprises applying a Poisson equation again to achieve temporal coherence after recovering values of the missing area.

In a preferred embodiment, the deblurring step further comprises evaluating the relative blurriness of each frame by calculating the gradient of the blurriness.

In a further preferred embodiment, the present method further provides regions of interest (ROI) step between the step of approximating the global motion path with polyline and the step of changing position of each frame in accordance with frame alignment along new motion path.

The examples below are non-limiting and are merely representative of various aspects and features of the present invention.

EXAMPLES

FIG. 1 showed the system framework of our algorithm. The input of our system was a video captured by a hand-held camcorder without using a tripod. Hence, the video had much annoying shaky motions due to the hand shakes. The first process of our system was motion path estimation. In this process, the camcorder motion path of the original video was estimated and changed to be a stabilized one. There were three steps contained in this process. In the first step, the transformation between the consecutive frames was found and combines all of the transformations to obtain the global camcorder motion path of the original video. In the second step, the video ROI were extracted from the video by considering both of the spatial and temporal regions of interests. In the third step, the estimated global camcorder motion path was approximated by a polyline. When the estimated camcorder motion path was fitted by a polyline, the extracted video ROI and the possibility of missing area completion were also taken into consideration in order to avoid the user's interested regions or objects being cut out and made the stabilized camcorder motion path as stable as possible.

After the stabilized camcorder motion path was achieved, the video completion process was applied. Because the position of each frame was changed according to the frame alignment along the new motion path, there were some missing areas within each aligned frame. The first step in the video completion was to detect if there exists moving objects and where they were. In the second step, the moving objects were separated as the dynamic foreground regions from the static background regions and complete the missing areas of them by different methods. To fill the missing areas using the pixels on the frames far from the current frame may cause the discontinuity at the boundaries of the filled areas, since the intensity of each video frame was usually not necessarily the same. In order to make a seamless stitching, a three-dimensional Poisson-based smoothing method was applied on the discontinuous regions.

Figure 2:
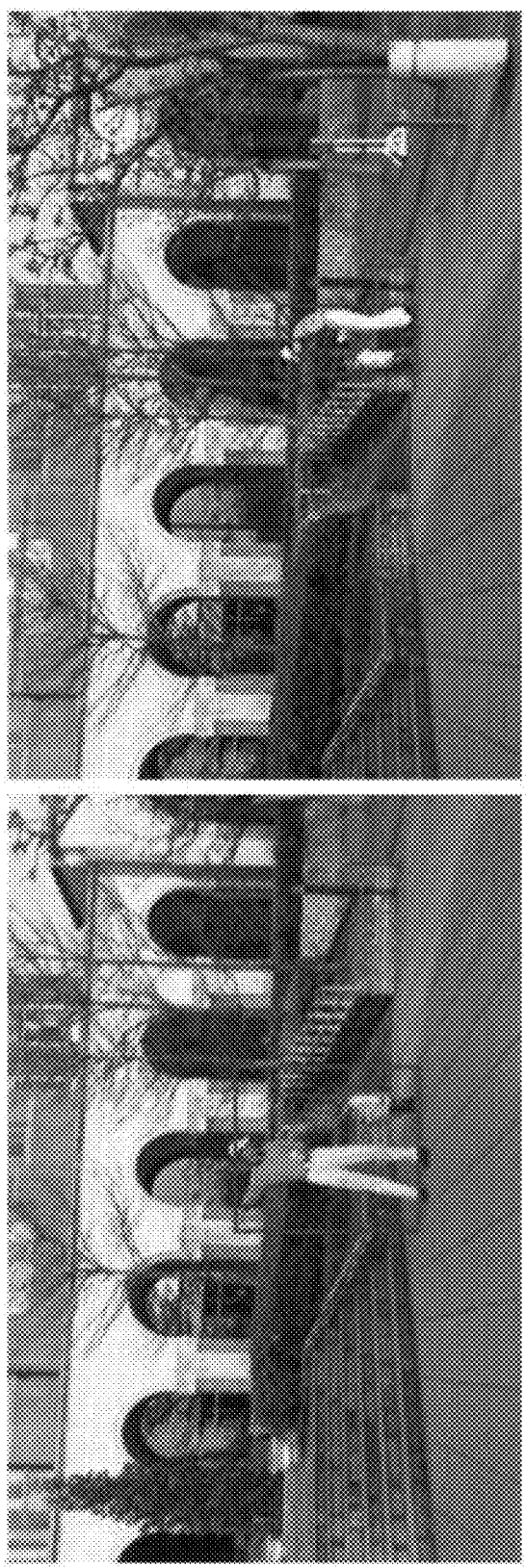
FIG. 2 indicates the detected moving objects.
Figure 3:
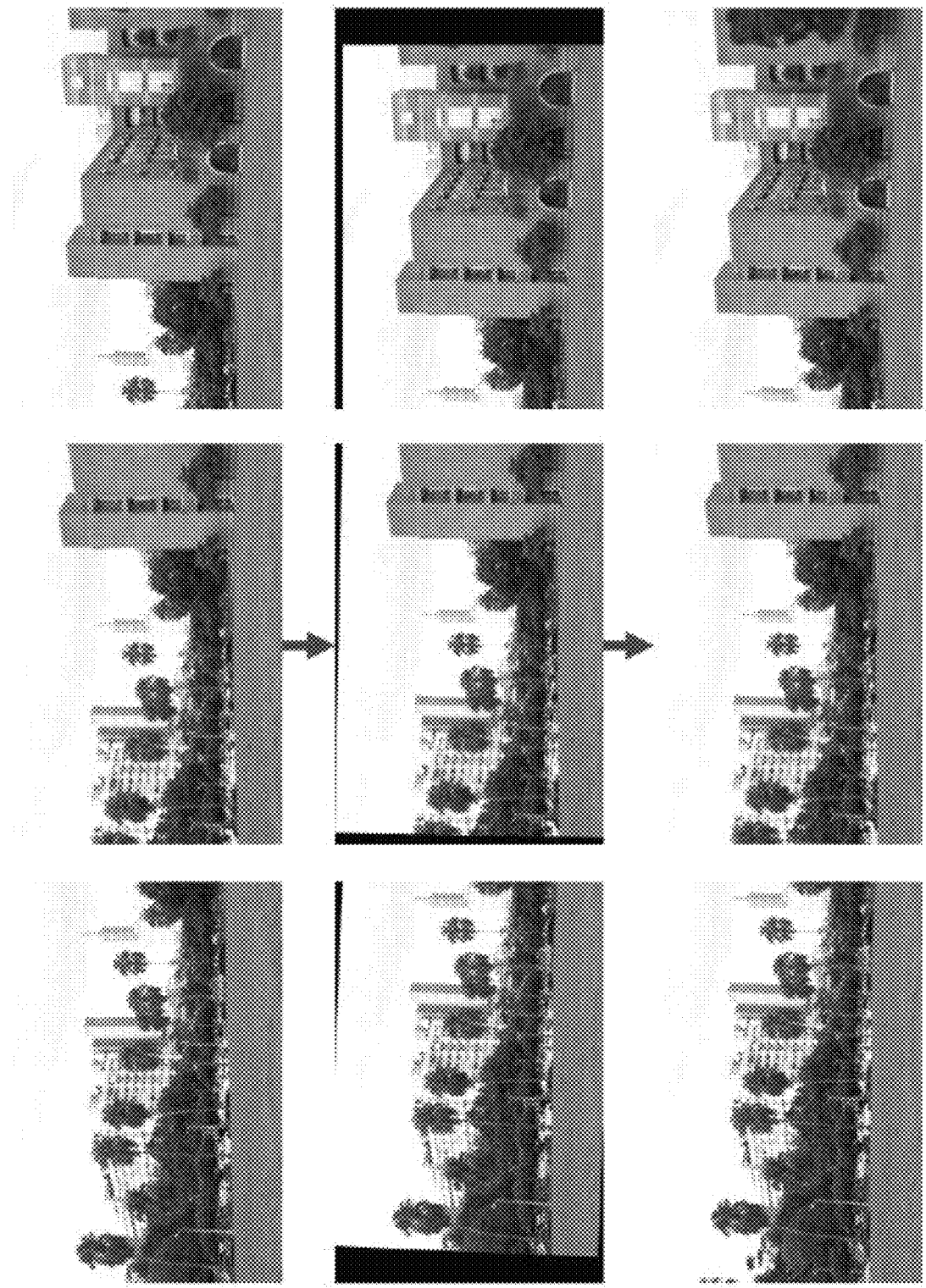
FIG. 3 indicates frames of video: Top row: Three frames of the original video. There are annoying shaky motions in the frames. Middle row: Stabilized frames. Black areas show the missing areas of the frames. Bottom row: Completed frames. This is the result of our invention; the shaky motions of the video are removed.

The last process was video deblurring. Because the motion blur of each frame could not be matched in the stabilized camcorder motion path, the blurry frames become much noticeable in the new stabilized video. Instead of finding the accurate point spread function for image deblurring, a video deblurring method was chosen by transferring the pixel values from neighboring sharper frames to the blurry frames. After the above automatic processes, the output would be a stabilized video with stable camcorder motion path while keeping the same resolution and quality as the original one. FIG. 2 shows detected moving objects. FIG. 3 showed three frames of an input video and their stabilized results before and after the video completion and deblurring processes.

The method of the present invention for full frame video stabilization with polyline-fitted camcorder path was described in detailed as follows.

1. Motion Path Estimation

In order to generate stabilized videos, the camcorder motion path of the original video was first estimated. Then, the original camcorder motion path was stabilized by using a polyline-based motion path, so that the undesirable motion caused by hand shake could be removed.

1.1 Global Path Estimation

To estimate the global camcorder motion path, the feature points of each frame were extracted by SIFT (Scale Invariant Feature Transform), which was invariant to scaling and rotation of the image. The feature points on every consecutive frame were matched if the distances between the feature descriptions were small enough and RANSAC (RANdom SAmple Consensus) was used to select the inliers of the matched feature pairs. For the accuracy, an over-constrained system was applied to find out the least square solution between these matched feature pairs and derive the affine transformation between the two consecutive frames. The affine transformation was represented by a 3×3 affine model which contains six parameters. That means if the transformation matrix were found $T_i$ between frame i and i+1, the corresponding pixel $p_i$ on the frame i and pixel $p_{i+1}$ on the frame i+1 had the following relationship: $p_{i+1}=T_i \cdot p_i$. Once the transformation matrices between the consecutive frames were obtained, all of the transformations could be combined to derive a global transformation chain.

1.2 Video ROI Extraction

To extract the video ROI from the input video, the temporal and spatial attention models were taken into consideration to produce the spatio-temporal saliency maps. The spatial attention model was based on an image ROI extraction method proposed by Itti et al. ("A model of saliency-based visual attention for rapid scene analysis. IEEE Transactions on Pattern Analysis and Machine Intelligence 20,11. (1998), 1254-1259), and the temporal attention model was extracted by considering the moving objects in the video, which was detected by using the local motion vectors obtained in moving object detection. In order to detect the moving objects in current frame i with whatever small or large motion, the moving objects were detected by checking the local motion vectors from the previous n frames to the next n ones, where n was a frame window size. After detecting the moving objects in the 2n+1 frames, the frame window size n was set to be 2n to detect the moving objects again in order to detect large motion. To generate the temporal saliency map SalT(i) of frame i, the temporal saliency maps $SalT(i)_n$ in different frame window sizes n were combined by taking the union of the temporal saliency maps. FIG. 2 showed the detected result.

To obtain the spatio-temporal attention model by combining the temporal and spatial attention models, the fusion methodology need to be set first. According to some observations, if the motion of the moving objects was large in the video, the spatio-temporal attention model should incorporate the temporal attention model more, otherwise it should incorporate the temporal attention model less. Then, the spatio-temporal saliency map Sal(i) was defined as Sal(i)=$kt_i$× SalT(i)+$ks_i$×SalS(i), where SalT(i) and SalS(i) were the temporal and spatial saliency maps of frame i, and the weighting parameters $kt_i$ and $ks_i$ were defined as $$kt_i = \frac{\alpha_i}{\alpha_i + \beta}, ks_i = \frac{\beta}{\alpha_i + \beta},$$

where $\beta \in (0, 1)$ is a constant value and $$\alpha_i = \frac{SalT(i)}{\max(SalT(i)) - \min(SalT(i))}$$

1.3 Motion Path Fitting

Figure 4:
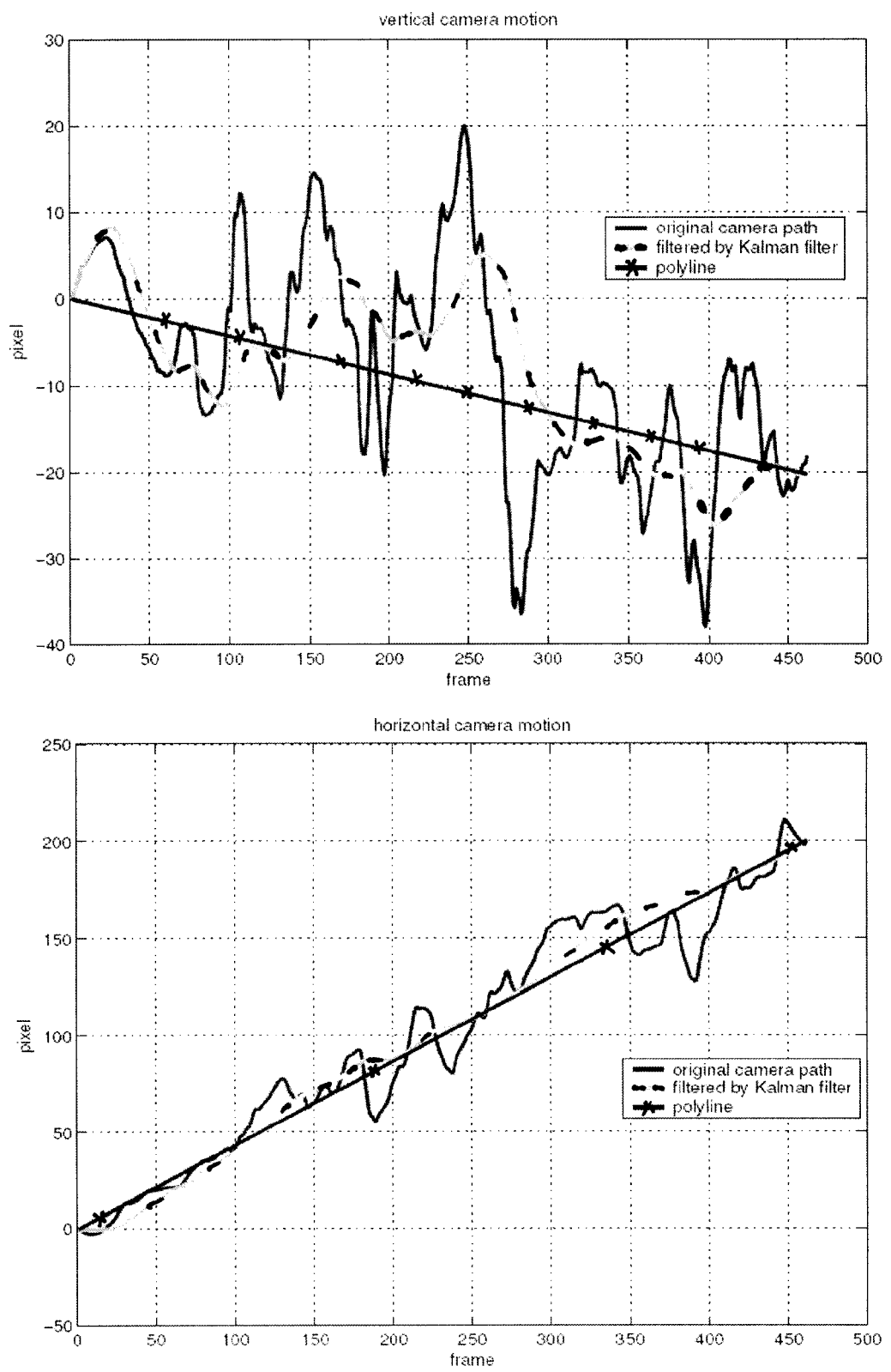
FIG. 4 indicates the original camcorder motion path (dark curve) and the estimated camcorder motion path after applying Kalman filter (light curve) and fitting by a polyline (dark straight line) for horizontal (Upper) and vertical (Lower) motion paths.

To obtain a stabilized camcorder motion path without not only the high frequency shaky motions but also the low frequency unexpected movements, a polyline was used to fit the estimated global camcorder motion path, since the camcorder motion path of the video captured with a tripod was like a polyline. The camcorder motion path estimated from global path estimation was separated first to be horizontal and vertical ones, and operate them respectively. Then, Kalman filter was employed to estimate a smooth camcorder motion path while considering the video ROI extracted. The camcorder motion path smoothed by the Kalman filter was shown as the light curves in FIG. 4.

Then, a polyline was used to fit the Kalman path while considering the possibility of missing area completion. To fill the missing areas, ideally it could be done by copying pixels from other frames. Once it could not be simply achieved, image inpainting would be used to fill the monotonous missing areas to make the stabilized camcorder motion path as stable as possible. Hence, the possibility of missing area completion was evaluated by using the gradient of each frame's boundary areas. Then, the camcorder motion path was fitted by a polyline while taking the video ROI and the possibility of missing area completion into consideration as shown as the blue polyline in FIG. 4.

Figure 5:
FIG. 5 shows top row: Aligned frames of the top row of FIG. 2 without considering video ROI. The black regions show the missing areas and the building is cut out. Bottom row: The saliency maps of the top row of FIG. 2.

Once the camcorder motion path was fitted by a polyline, the video frames were aligned along the polyline fitted camcorder motion path. If the global transition matrix from the first frame to the i-th frame was denoted by $M_i$, then the i-th frames aligned to $M_i \cdot \Pi_{j=i-1}^{0} T_j^{-1} \cdot p_i$, where $p_i$ means the pixels on i-th and $T_j$ repressed affine transformation between j-th and j+1-th frame. Hence, a stabilized video could be obtained after the polyline fitting and frame alignment. The top row of FIG. 5 showed the frames aligned by a polyline-fitted camcorder motion path without taking video ROI into consideration. Hence, the building in the original video which the user wants to capture was cut out. By considering the saliency maps of the original video as shown in the bottom row of FIG. 5, a proper polyline-based camcorder motion path could be found and the stabilized result was shown in the bottom row of FIG. 2.

2 Video Completion

After aligning the video frames along the stabilized camcorder motion path, there were several missing areas in the new stabilized video. Traditionally, this problem could be solved by cutting out the missing areas and scaling the stabilized video to its original size, but it would result a stabilized video with worse resolution. Hence, to make the resolution of the stabilized video as good as that of the original one, the missing areas were filled from other frames.

To complete the video, the moving objects to segment the video were detected first to a static background region and some dynamic moving object regions. Then, the missing areas were completed by filling dynamic regions and static regions respectively. Since the camcorder motion path was fitted by a polyline, the missing areas would be large and need to be filled by the pixels on the frames far from the current frame, so a three-dimensional Poisson-based smoothing method were provided to smooth the discontinuity stitched areas.

2.1 Moving Object Detection

In order to detect moving objects, every pair of adjacent frames was aligned first by using the affine transformation obtained in global path estimation. Then, the optical flows of them were evaluated to obtain the motion vector of each pixel. The motion vector of pixel $p_i$ could be described as $F_i(p_i)$ which represents the motion flow at pixel $p_i$ from frame i to frame i+1, and the length of the motion vector showed the motion value. Hence, the pixel pi on frame i and its corresponding pixel pi+1 on frame i+1 according to the motion vector had the relationship: pi+1=Ti·Fi(pi), since the motion vector was obtained after aligning the frame according to the affine transformation matrix Ti.

Figure 6:
FIG. 6 shows left frame: after changing the position according to the stabilized camcorder motion path; right frame: the mask of detected moving objects (white regions).

The motion values in the moving object regions were considered to be relatively larger than those in the static background region. Hence, a simple mask was obtained to show the regions with large motion values by a simple threshold as shown in FIG. 6. The dynamic regions were obtained by evaluating the dilation of the mask, which could help to guarantee the boundary of the moving objects was involved in the dynamic regions. If the missing area falls in the regions where the neighboring pixels had been asked as the dynamic region, this area was treated as the dynamic region and motion inpainting was used to complete the area, otherwise the area was recovered by mosaicing.

2.2 Dynamic Region Completion

For the dynamic missing regions, instead of filling in the color values from other frames directly, they were filled up with correct motion vectors. Once the motion vectors of each pixel in the missing areas were derived, the pixel color could be obtained from the next frame according to the motion vectors. The local motion vectors in the known image areas would be propagated to the dynamic missing areas.

Figure 7:
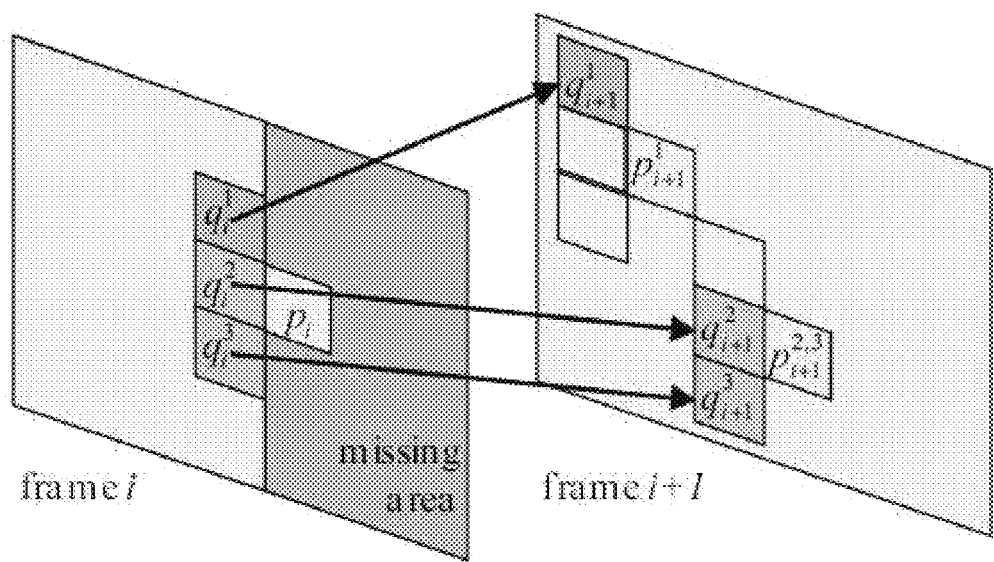
FIG. 7 shows the motion vector of pixel $p_i$ at the missing area of frame i is determined by weighted averaging the motion vectors of its neighboring pixels $q^j_i$, j=1, 2, 3 at the known area. The weight is defined by the color difference between pi and $q^j_i$. Hence, even if the directions of the motion vectors of the neighboring pixels are not the same (like $q^1_{i+1}$), according to the color similarity of $p_{i+1}$ and $q^j_{i+1}$, the motion vector to $p^{2,3}_{i+1}$ will be used and that to $p^1_{i+1}$ will be almost ignored.
Figure 8:
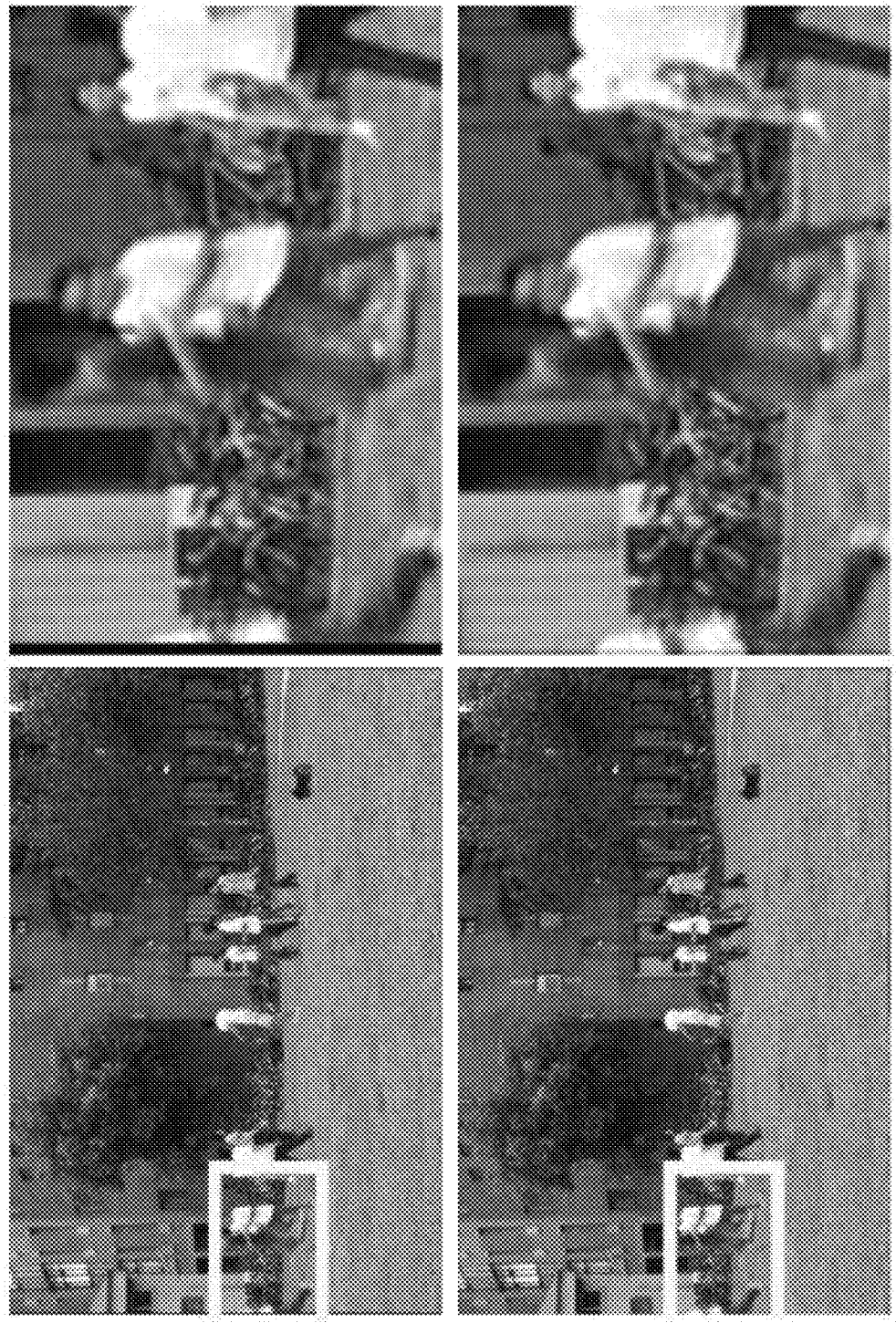
FIG. 8 shows frame after changing position (upper-left) in accordance with the stabilized camcorder motion path and path. There is a missing area at the left side and a moving object across the missing area and the result of dynamic region completion (lower-left). Right Column shows the close up view of the yellow square of the Left Column.

First, local motion vectors were estimated by computing the optical flow between the stabilized frames. The propagation starts at the pixel on the boundary of the dynamic missing areas, its local motion vector was calculated as a weighted average of the motion vectors of its neighboring pixels at known areas. The process would continue until the dynamic missing areas were filled with motion vectors completely. If $p_i$ was a pixel in the missing area, it would be filled according to its motion vector which was determined by $$F_i(p_i) = \frac{\sum_{q_i \in N_{p_i}} w(p_i, q_i) F_i}{\sum_{q_i \in N_{p_i}} w(p_i, q_i)},$$

where $w(p_i, q_i)$ denotes the contribution of the motion vector of pixel $q_i$, $N_{p_i}$ denotes the eight neighboring pixels of $p_i$, and $F_i(p_i)$ represents the motion vector at pixel $p_i$ from frame i to frame i+1. Suppose the neighboring pixel $q_i \in N_{pi}$ already had a motion vector, according to its motion vector, its position could be estimated on the next frame as $q_{i+1}$. By using the geometric relationship between the pixel $p_i$ and $q_i$, the position of the pixel $p_{i+1}$ in the frame i+1 could also be determined as illustrated in FIG. 7. Since the pixels in the same object had similar color values and move in the same direction, if the difference between the color values of the pixels $q_{i+1}$ and $p_{i+1}$ was small, they would likely belong to the same object, and the weight of the motion vector of pixel $q_i$ was set to be large as $$w(p_i + q) = \frac{1}{(ClrD(p_{i+1}, q_{i+1}) + \varepsilon)},$$

where $\varepsilon$ was a small value for avoiding the division by zero and $ClrD(p_{i+1}, q_{i+1})$ was the $l^2$-norm color difference in RGB color space of the pixels $q_{i+1}$ and $p_{i+1}$. This weight term guarantees that the contribution of the motion vector in different object was small. FIG. 8 showed the result.

2.3 Static Region Completion

Figure 9:
FIG. 9 shows the frame (left) after changing position in accordance with the stabilized camcorder motion path resulted in a missing area at the right side and upper side and after static region completion the missing area was recovered (right).

After completing the dynamic regions, the static ones were recovered by its neighboring frames which were wrapped to the current frame according to the affine transformation obtained. For the pixel $p_i$ in the static missing area at frame i, if there exists its corresponding pixel $p_{i'}$ at the warped neighboring frame i', the pixel was directly copied to the missing pixel $p_i$. FIG. 9 showed the static region completion result.

To find the corresponding pixel $p_i'$ of $p_i$, searching from the nearest neighboring frame and propagate the search out. For example, if i was the current frame to be recovered, the frames i−1 and i+1 were searched first, if there were missing areas still had not been recovered by the two frames, the following frame i−2 and i+2 were used to recover the missing areas. Keeping the search until all the missing pixels in the static missing areas was completed. Finally, if there were still some missing areas could not be recovered; simple image inpainting approach was used to complete them. Since the polyline-fitted camcorder motion path was determined by considering the gradient of each frame's boundary areas, the rest missing areas could always be completed.

2.4 Poisson-Based Smoothing

Although the missing areas caused by the stabilized camcorder motion path were completed, there would be a discontinuous boundary between the recovered pixels and the original frame, since the missing areas would be large and needed to be filled from the frame far from the current one. In order to keep the spatial and temporal continuity, a three-dimensional Poisson-based smoothing method was provided. Poisson-based smoothing approach was often used in image editing, and this approach was extended for video editing.

To solve the discontinuity problem, before filling in a pixel from other frames, the Poisson equation was applied to obtain a smoothed pixel by considering its neighboring pixels in the same frame and neighboring frames. The Poisson equation was first applied in the spatial domain which was written as: For all $p \in \Omega$, $$|N_p|f_p - \sum_{q \in N_p \cap \Omega} f_q = \sum_{q \in N_p \cap \partial \Omega} f_q^* + \sum_{q \in N_p} v_{pq},$$

where $\Omega$ denotes the missing area, p was a pixel in the missing area $\Omega$, $N_p$ denotes the neighboring pixels of pixel p, $|N_p|$ was the number of neighboring pixels $N_p$, $f_p$ and $f_q$ the correct pixel values of pixels p and q, and $v_{pq}$ determines the divergence of pixels p and q, $\partial \Omega$ was the region surrounding the missing area $\Omega$ in the known image areas, and $f^*_q$ denotes the known color of pixel q in $\partial \Omega$.

Figure 10:
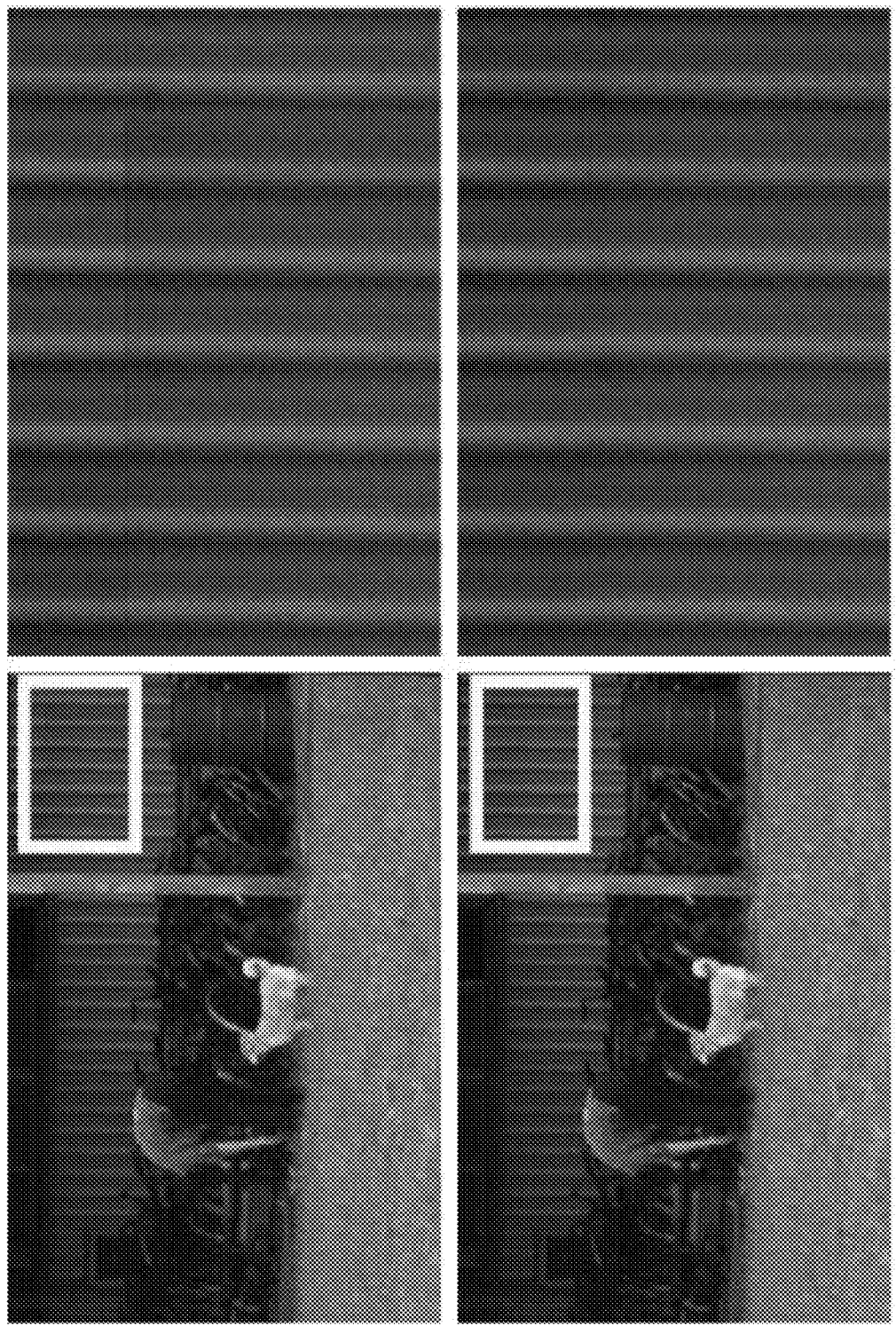
FIG. 10 shows frame after video completion (upper-left) and the result of video completion with Poisson-based smoothing (lower-left), and close up view of the square area at right column.

The Poisson equation could keep the correct structure in the missing area and achieve a seamless stitching between the recovering areas and known image areas. In order to achieve temporal coherence, after recovering values of the missing areas by apply the Poisson equation again. For the missing areas, it could consider not only the spatial neighboring pixels but also temporal neighboring pixels. Hence, the Poisson equation was the same, but $N_p$ includes all neighboring pixels of pixel p in the video volume. FIG. 10 showed the result.

3. Video Deblurring

After video stabilization, the blurry frames which look smooth in the original video become noticeable. For video deblurring, the moving objects were separated from static background first, and deal with them respectively as the video completion process.

The main idea of this method was to copy the pixels of neighboring sharper frames to the blurry frames. First, the "relative blurriness" of each frame was evaluated by calculating the gradient of it. Generally, the gradient of blurry image was smaller than that of sharper one at the same regions. With this assumption, the blurriness of frame i was defined as:

$$B_i = \sum_{p_i} (g_x(p_i)^2 + g_y(p_i)^2),$$

where $p_i$ was the pixel of frame i, and $g_x$ and $g_y$ were the gradients of x- and y-directions, respectively. The relative could be derived between the current frame and its neighboring by comparing their blurriness. If the blurriness $B_i$ of current frame i was smaller than the blurriness $B_i$ of its neighboring frames i', then the frames i' were treated be sharper than the frame i and the frames i' was used to recover the current blurry frame i by transferring the corresponding pixels from these sharper frames i' to the blurry frame i by $$\tilde{p}_i = \frac{p_i + \sum_{i' \in N_i} w_{i'}^j T_{i'}^j (p_i')}{1 + \sum_{i' \in N_i} w_{i'}^j},$$

where $\tilde{P}_i$ and $p_i$ were the same pixel in the frame i after and before the deblurring operation, $N_i$ denotes the neighboring frame of current frame i, $p^{i'}$ was the corresponding pixel of $p^i$ according to affine transformation $T^i_{i'}$ and local motion vector $F^i_{i'}(p^{i'})$ from frame $i' \in N_i$, to frame i, i.e., $p_i = T^i_{i'} p_{i'}$ for static regions and $p_i = T^i_{i'} F^i_{i'}(p^{i'})$ for dynamic ones, and $w^j_{i'}$ was a weighting factor between i' and i which was defined as:

$$w_{i'}^j = \begin{cases} 0 & \text{if } B_{i'}/B_i < 1 \\ B_{i'}/B_i & \text{otherwise} \end{cases}.$$

Figure 11:
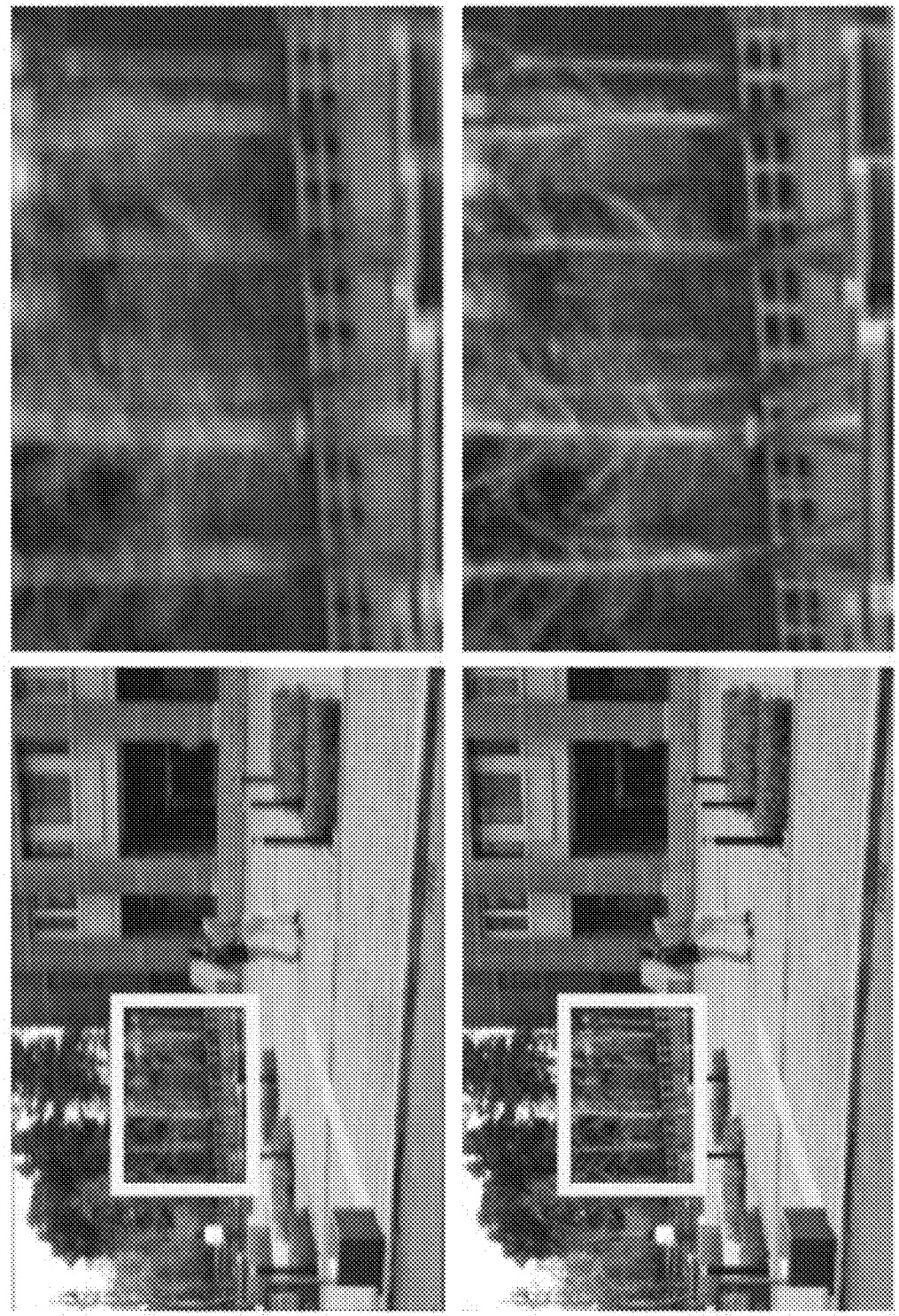
FIG. 11 shows a blurry frame (upper-left) and the result of video deblurring (lower-left), and the close up view of the square at the right column.

FIG. 11 showed the result.

4. Result

All of the videos used in this paper were captured by using a hand-held camcorder without using a tripod, and the resolution of the videos were 720×480. The resolutions of all resulted (stabilized) videos were the same as the input ones. FIG. 2 and FIGS. 12~15 show our results. In FIG. 2, the user wants to use the hand-held camcorder to capture a panorama view. Without a tripod, the captured videos were shaky due to the hand shakes. Although the camcorder motion path could be stabilized by a polyline-based camcorder motion path, without taking video ROI into consideration, the stabilized motion path would cause the building to be cut out as the top row of FIG. 5. The bottom row of FIG. 2 showed our result which was stabilized as captured by using a tripod and the building could be preserved in the stabilized video.

Figure 12:
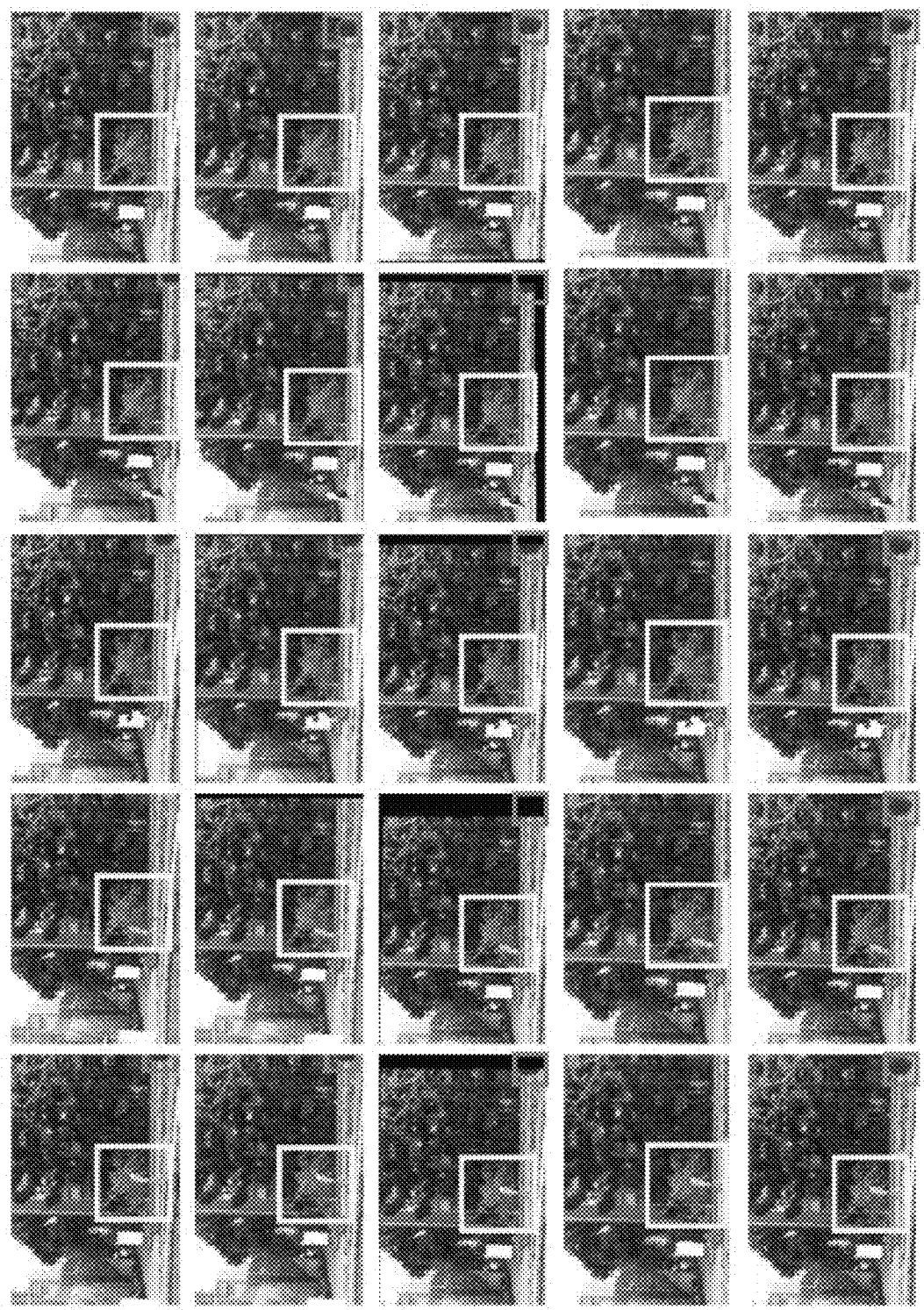
FIG. 12 shows Top row: Five frames of the original video. Rectangles show two trees in the video. Due to the camcorder hand-shake, the locations of the rectangles in each frame are different. Second row is stabilized frames resulted by smoothing the camcorder motion path. The black regions show the missing areas. Since only high frequency shaky motions are removed, the rectangles still locate at different place in each frame. Third row is stabilized frames resulted by polyline-fitted camcorder motion path. The locations of the trees (rectangles) are almost the same, but the missing areas are large. Fourth row is the result produced by truncating the missing areas of the third row. The resolution of the stabilized video is reduced, and the tree specified by the yellow rectangle has been cut out. Bottom row: results of the present invention.

In FIG. 12, the hand-held camcorder was used to capture a static scene. Although the shaky camcorder motion path could be smoothed by using other smoothness methods, the second row of FIG. 12 still had some unwanted motions. The bottom row of FIG. 12 showed our result. The estimated camcorder position was fixed as captured by using a tripod. For comparison, the forth row of FIG. 12 showed the result of truncating the missing areas and the resolution was reduced.

Figure 13:
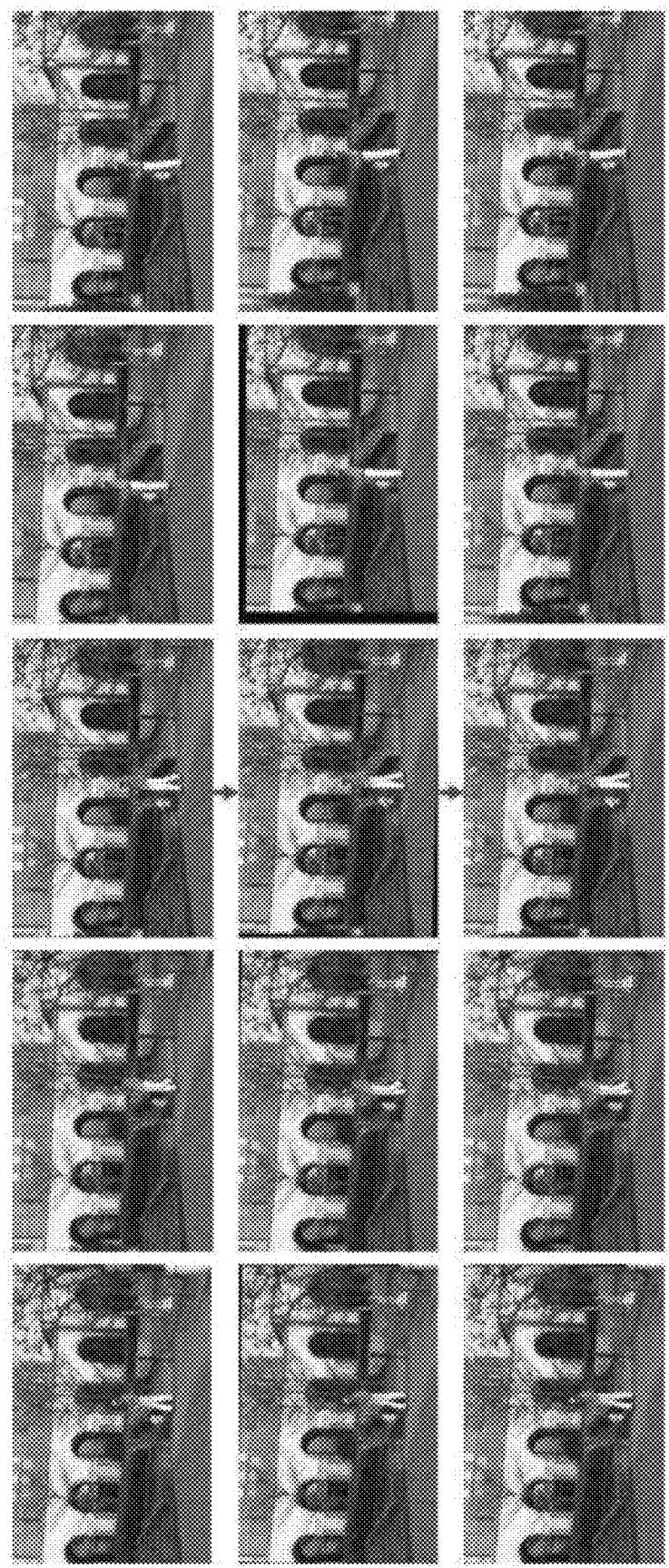
FIG. 13 shows five frames of the original video (top row), stabilized frames (middle row) (black areas show the missing areas of the frames), and the results of the present invention (bottom row).
Figure 14:
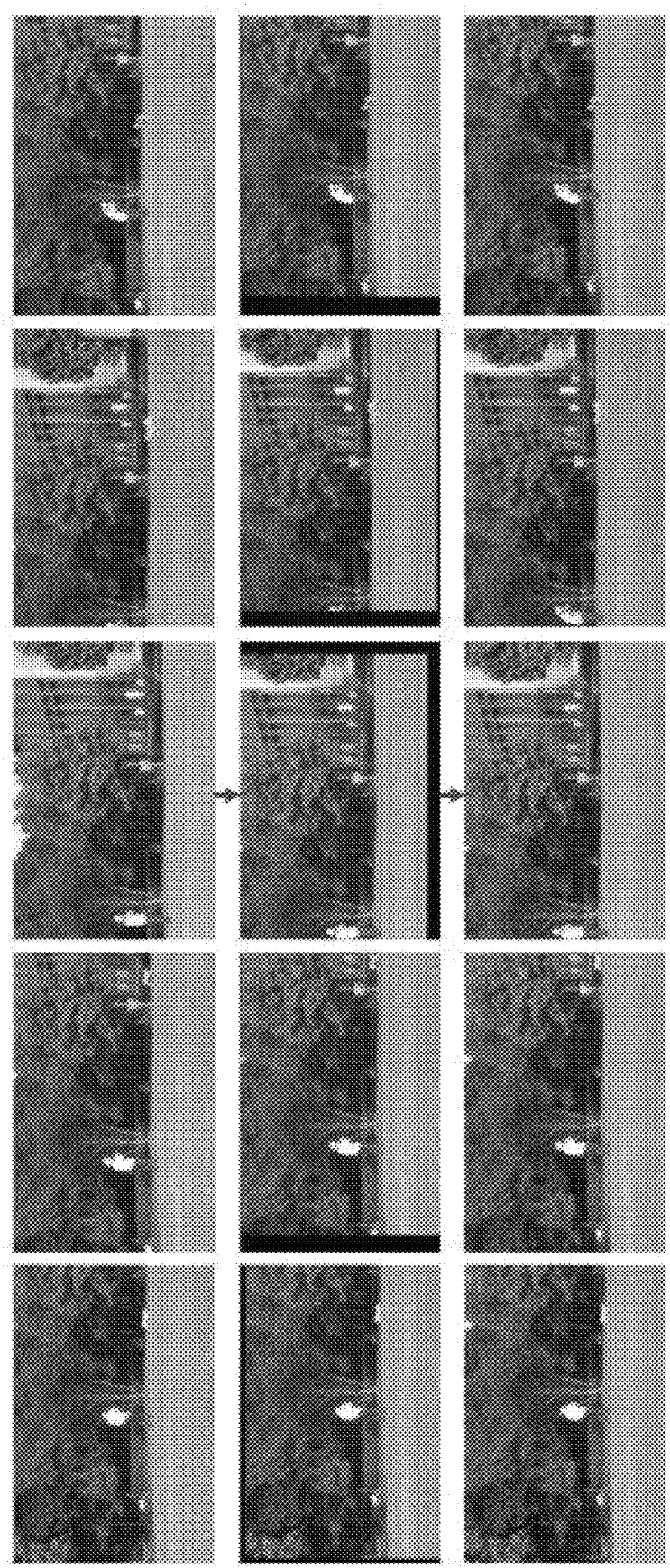
FIG. 14 shows: Top row: Five frames of the original video. Middle row: Stabilized frames. The black regions show the missing areas. Bottom row: The results of the present invention.
Figure 15:
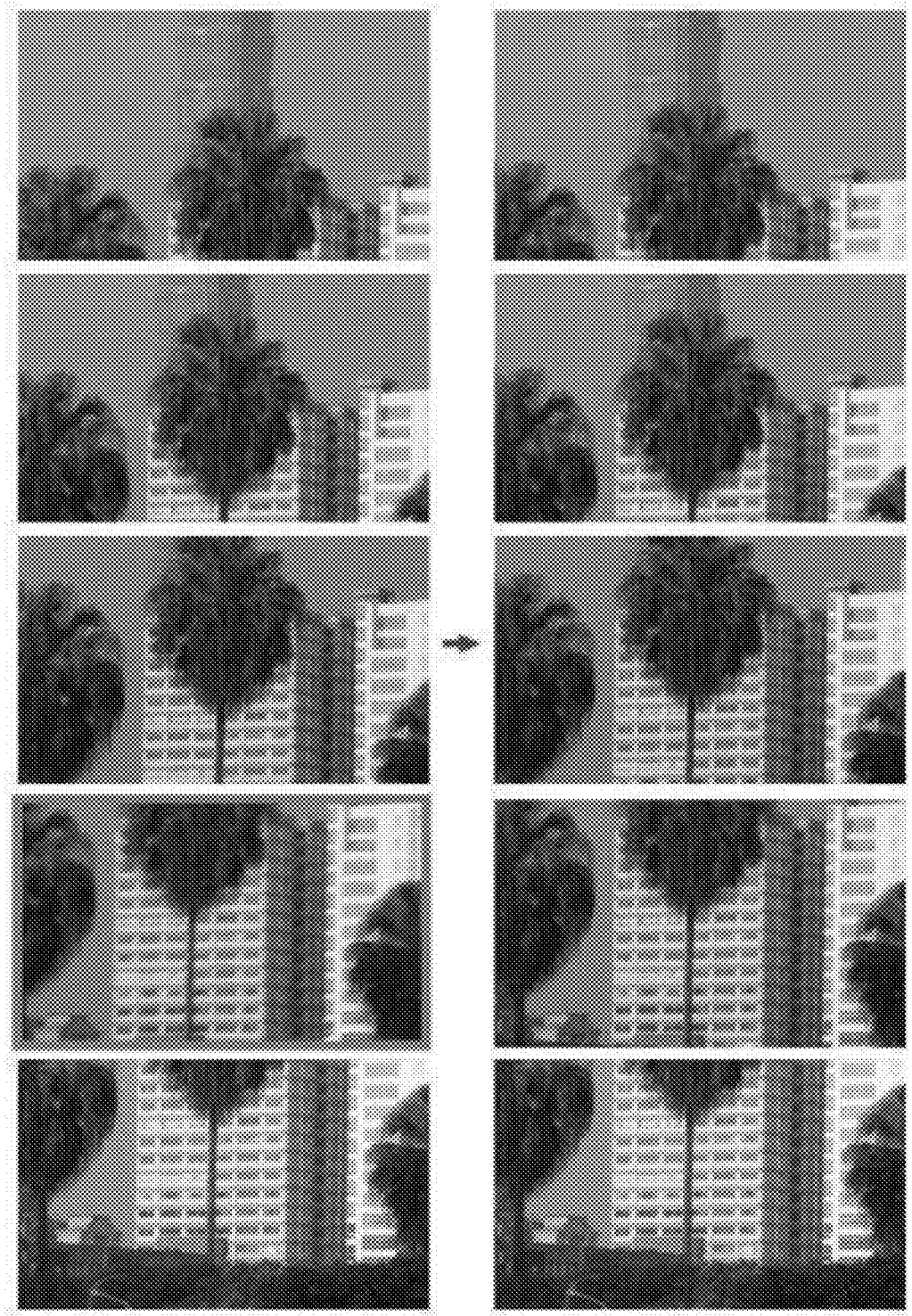
FIG. 15 shows: Left: Five frames of the original video. Right: The results of the present invention. The blurry frame specified by the grey rectangle has been deblurred.

In FIG. 13, the user wanted to use a hand-held camcorder to capture a man walking with his child. Without a tripod, the captured video was shaky due to the hand shakes. The bottom rows of FIG. 13 showed our result which was stabilized as captured by using a tripod. In FIG. 14, the user wanted to use a hand-held camcorder to capture a man playing with his dog, but due to the view angle limitation, the user pans the camcorder a little bit to capture the whole scene. The bottom row of FIG. 14 showed our result and the stabilized camcorder motion path was just like to capture the scene by using a tripod. In FIG. 15, the user wants to use a handheld camcorder to capture some high buildings. The right column of FIG. 15 showed out result, and the blurry frame specified by the orange rectangle had also been deblurred.

A full-frame video stabilization approach was proposed in this invention to obtain a stabilized video while considering the video ROI in the input video. Since a polyline was used to fit the original camcorder motion path, the stabilized camcorder motion path was much more stable than other smoothness approaches. Hence, in the stabilized video, not only the high frequency shaky motions but also the low frequency unexpected movements were removed. Although using a polyline to estimate the camcorder motion path would cause large missing areas and cut out some capturing objects, the two problems were solved by applying a three dimensional Poisson-based smoothing method and taking the video ROI into consideration. To fill the missing areas from other frames and deal with blurry frames, the moving objects were separated from the static background and deal with them respectively in completion and deblurring processes.

One skilled in the art readily appreciates that the present invention is well adapted to carry out the objects and obtain the ends and advantages mentioned, as well as those inherent therein. The cell lines, animals, and processes and methods for producing them are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

What is claimed is:

1. A method of full frame video stabilization of a hand-held camcorder with a polyline-fitted camcorder path, comprising the steps:
    a) making motion path estimation, further including steps:
        i) combining transformations between consecutive frames to obtain a global motion path of an original video;
        ii) approximating the global motion path with polyline;
        iii) providing region of interests for fitting the camcorder path by the polyline;
        iv) changing position of each said consecutive frame in accordance with frame alignment along a new motion path;
    b) making video completion, further including steps:
        i) detecting and locating existing moving objects;
        ii) separating the moving objects as dynamic foreground regions from static background regions and completing missing areas;
        iii) getting a simple mask to show regions with large motion values in moving object regions by a threshold, thereby obtaining dynamic regions by evaluating dilation of the mask;
        iv) filling the missing areas with pixels on a frames far from a current frame;
        v) smoothing discontinuous regions by applying a three-dimensional Poisson-based approach; and
    c) deblurring image of frames by transferring pixel values from neighboring sharper frames to blurry frames.

2. The method of claim 1 wherein the combining step further comprises extracting the feature points of each frame by SIFT (Scale Invariant Feature Transform), which is invariant to scaling and rotation of the image.

3. The method of claim 1 wherein the approximating step further comprises separating the camcorder motion path to be horizontal path and vertical path.

4. The method of claim 1 wherein the approximating step further comprises applying Kalman filter to estimate a smooth camcorder motion (Kalman path) which is represented in two-dimensional space.

5. The method of claim 1 wherein the approximating step further comprises using a polyline to fit the Kalman path.

6. The method of claim 1 wherein the detecting step further comprises using an affine transformation.

7. The method of claim 1 wherein the detecting step further comprises using an optical flow approach to obtain the motion vector of each pixel.

8. The method of claim 1 wherein the separating step further comprises evaluating the motion value of pixels within each frame by calculating the length of the motion vector.

9. The method of claim 1 wherein the filling step further comprises using a geometric relationship to estimate position of the dynamic object pixel on the next frame according to motion vector of the object pixel.

10. The method of claim 1 wherein the filling step further comprises filling missing dynamic frames with estimated motion vectors instead of filling from neighbor frames directly.

11. The method of claim 1 wherein the filling step further comprises directly copying the warped neighboring frames to the missing static frames.

12. The method of claim 1 wherein the filling step further comprises using a simple image inpainting approach to complete static missing areas that cannot be recovered.

13. The method of claim 1 wherein the smoothing step further comprises applying a Poisson equation again to achieve temporal coherence after recovering values of the missing area.

14. The method of claim 1 wherein the deblurring step further comprises evaluating the relative blurriness of each frame by calculating the gradient of the blurriness.

* * * * *